United States Patent [19]

Kemeny

[11] Patent Number: 5,718,095
[45] Date of Patent: Feb. 17, 1998

[54] METHOD AND DEVICE FOR ATTENUATING VIBRATION

[75] Inventor: Zoltan A. Kemeny, Tempe, Ariz.

[73] Assignee: MM Systems of Arizona, Phoenix, Ariz.

[21] Appl. No.: 524,715

[22] Filed: Sep. 7, 1995

Related U.S. Application Data

[63] Continuation of Ser. No. 208,868, Mar. 11, 1994, abandoned.

[51] Int. Cl.⁶ .................................................. E04B 1/38
[52] U.S. Cl. ........................... 52/698; 52/167.7; 52/403.1; 248/60; 248/634
[58] Field of Search ..................... 52/393, 402, 403.1, 52/167.4, 167.7, 167.8, 167.9, 480, 698, 506.05, 506.06, 508; 248/60, 603, 634, 560

[56] References Cited

U.S. PATENT DOCUMENTS 2,115,238  4/1938  Stevens ........................ 52/403.1
5,398,907  3/1995  Kelchner ........................ 248/60

FOREIGN PATENT DOCUMENTS 89979   3/1992  Japan ........................... 52/167.7
432362  7/1935  United Kingdom ............... 52/403.1

*Primary Examiner*—Michael Safavi
*Attorney, Agent, or Firm*—Snell & Wilmer L.L.P.

[57] ABSTRACT

A vibration attenuation device comprises a first section and a second section, each section comprising an insulating material such as rubber. The first section and the second section are aligned end-to-end. Typically, the insulating material is cylindrically-shaped to provide for easy alignment between the two sections. The base of a U-shaped first anchor is substantially surrounded by the insulating material of the first section. The base of a U-shaped second anchor is substantially surrounded by the insulating material of the second section. The legs of the first anchor extend from the base of the first anchor to beyond the base of the second anchor and the legs of the second anchor extend from the base of the second anchor to beyond the base of the first anchor. Additional sections comprising insulating material and anchors may be added to provide more flexibility.

19 Claims, 2 Drawing Sheets

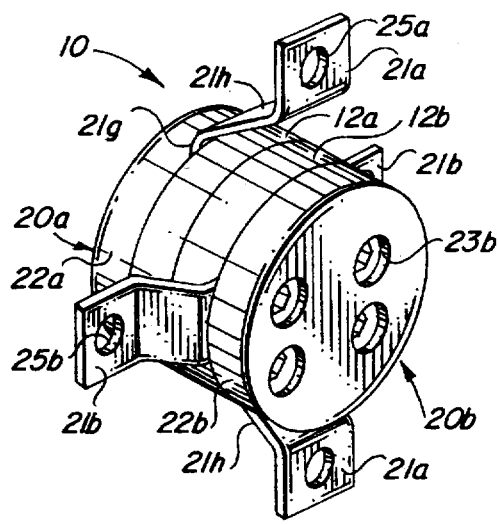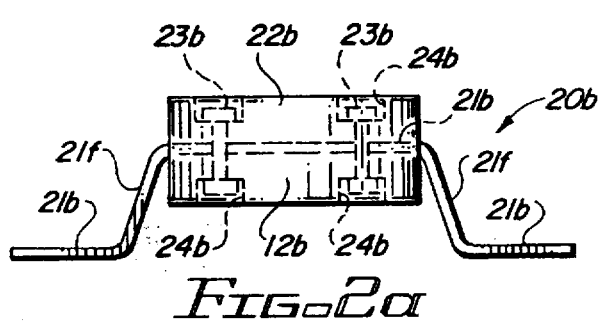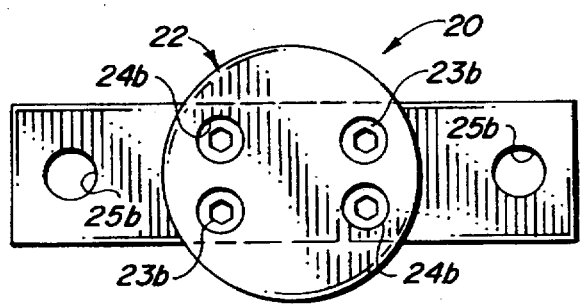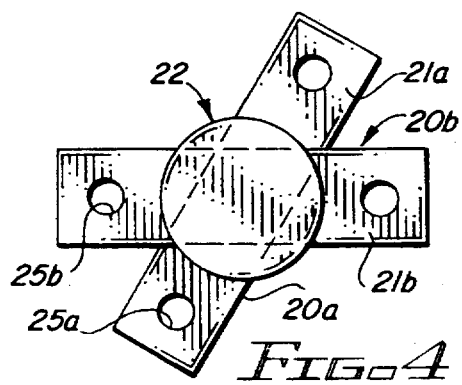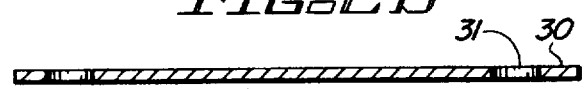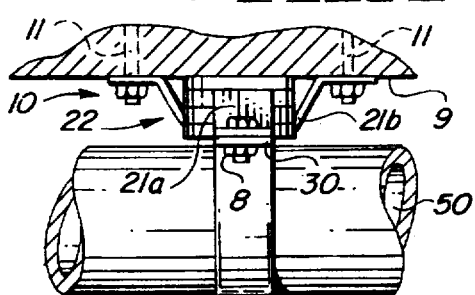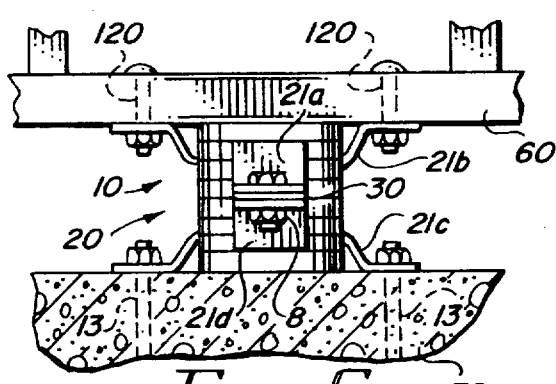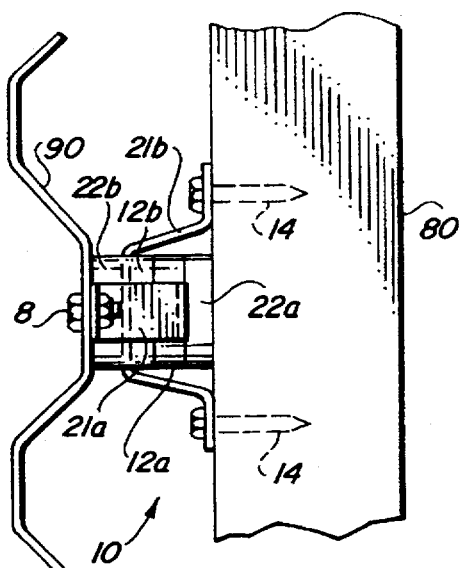

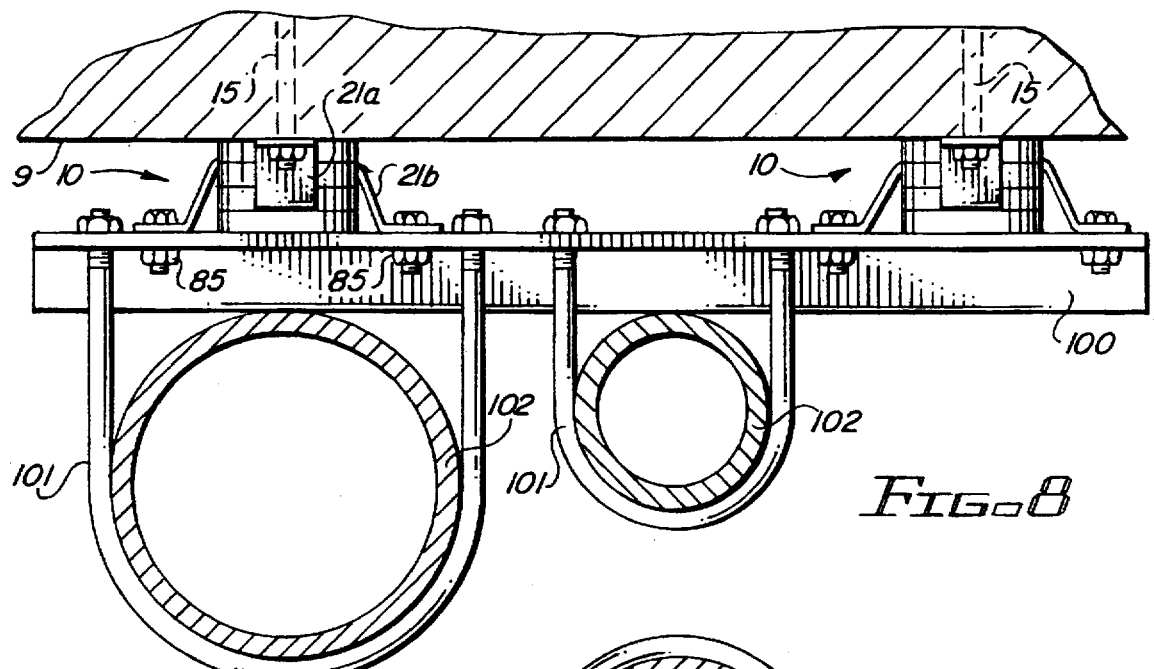
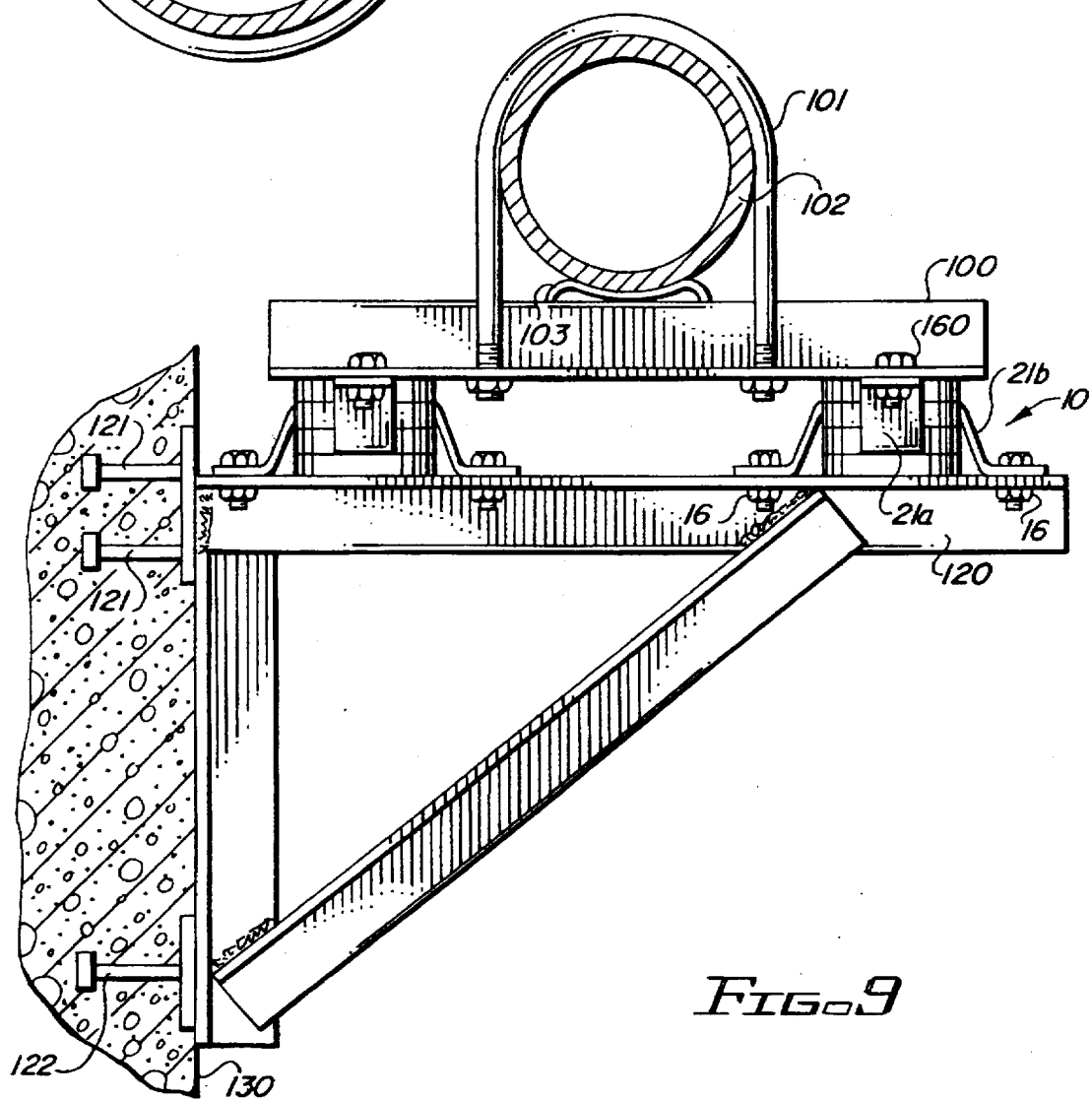

1

METHOD AND DEVICE FOR ATTENUATING VIBRATION

RELATED APPLICATION

This is a continuation of U.S. patent application Ser. No. 08/208,868 filed Mar. 11, 1994 now abandoned.

FIELD OF THE INVENTION

The present invention relates generally to a device for reducing vibration and, more particularly, to a method and device for reducing and isolating vibration and seismic forces between nonstructural building components and other miscellaneous structures.

BACKGROUND OF THE INVENTION

It is becoming increasingly common to design buildings and other structures, such as bridges, to withstand seismic forces caused by earthquakes. This is done, in part, by mounting these structures on seismic isolators. Little attention, however, has been paid to isolating nonstructural building components such as boiler brackets, mounts for hanging pipes, and the like, from seismic forces. Generally these components are of a rigid construction and are secured directly to the building or other structure without any seismic isolation capacity. Downsizing seismic isolators used in buildings for use with nonstructural building components has been unsuccessful as the building components need isolators that have three-dimensional tension-compression-sheer capacity.

Accordingly, it is highly desirable to have a vibration and seismic force attenuation device that can be used for nonstructural building components and other miscellaneous structures. This device should be able to isolate three-dimensional tension-compression-sheer forces. It should be simplistic in design and construction, easy to use, and inexpensive to manufacture. It should yield and extensively deform before failure. It is also highly desirable for this device to be able to work as an impact attenuator and cushion for components that receive direct impacts, such as guard rails that line highways for preventing cars from straying off the road.

SUMMARY OF THE INVENTION

A device built in accordance with the present invention addresses many of the shortcomings of the prior art in reducing and isolating vibration and seismic forces between nonstructural building components and other miscellaneous structures.

In accordance with one aspect of the present invention, a vibration attenuation device comprises a first section having an end and some type of insulating material. The device further comprises a second section also having an end and some type of insulating material, wherein the end of the second section is adjacent to the end of the first section. The device further includes a first anchor having a base and legs with the base of the anchor being substantially surrounded by the insulating material of the first section. The device also includes a second anchor having a base and legs wherein the base of the second anchor is substantially surrounded by the insulating material of the second section. The legs of the first anchor extend from the base of the first anchor to beyond the base of the second anchor and the legs of the second anchor extend from the base of the second anchor to beyond the base of the first anchor. When the device is secured to receiving members such as walls, ceilings and the like, the insulating material between the two anchors will slightly compress and prevent the two sections from being loose or unstable. The attenuation device will reduce and offset the exposure of the receiving member to vibrations and seismic forces.

In accordance with a further aspect of the present invention, additional sections comprising of insulating material and anchors may be added to provide more flexibility.

In accordance with a further aspect of the present invention, the device can be incorporated in a variety of circumstances and situations. For example, it can be used for mounting a hanging pipe to a rigid structure, such as a ceiling or can be used to cushion components that receive direct impacts such as guard rails that line highways.

BRIEF DESCRIPTION OF THE DRAWINGS

For a fuller understanding of the present invention, reference is had to the following description taken in connection with the accompanying drawings, wherein like numerals designate like elements, and:

FIG. 1 is a perspective view of a vibration attenuating device in accordance with a first embodiment of the present invention;

FIG. 2a is a cross-sectional view of one of the anchor sections of FIG. 1;

FIG. 2b is a plan view of the anchor section illustrated in FIG. 2a;

FIG. 3a is a coupling plate that may be used with a vibration attenuating device in accordance with another embodiment of the present invention;

FIG. 3b is a plan view of the coupling plate shown in FIG. 3a;

FIG. 4 illustrates one possible alignment configuration for two anchor sections in a vibration attenuating device;

FIG. 5 illustrates the use of the present invention as a mount for hanging pipes from a ceiling;

FIG. 6 is an exemplary illustration of the present invention used for mounting a stud wall to a foundation;

FIG. 7 illustrates in cross-section the present invention as used for securing a highway guard rail to a post;

FIG. 8 is a cross-sectional view of an implementation of the present invention in which a common rail for hanging pipes is mounted to a ceiling; and FIG. 9 is a cross-sectional illustration of the present invention as used as a mount for hanging pipe from a rigid frame.

DETAILED DESCRIPTION OF PREFERRED EXEMPLARY EMBODIMENTS

Referring now to FIG. 1, an exemplary vibration attenuating device 10 comprises a plurality of anchor sections. In this first embodiment, vibration attenuator 10 comprises two anchor sections 20a and 20b. Preferably, anchor section 20a and anchor section 20b are of a similar construction and configuration, thus simplifying the design of the device and providing for low cost construction.

FIGS. 2a and 2b show a cross-sectional and plan view, respectively, of an exemplary anchor section 20b. Anchor section 20b comprises an insulating material 22. This material may be rubber, polyether urethane, revolcanized tire flakes, or any other material that prevents the transmission of vibration generally. Insulating material 22 may be a singular piece of material or, as shown in FIG. 2a, may comprise a plurality of separate portions 12b and 22b. The portions are preferably cylindrically shaped to provide for easy alignment. An anchor 21b, having a base 21e and legs 21f, is positioned at its base between insulating portions 12b and 22b such that the base is substantially surrounded by insulating material 22. In a preferred embodiment, anchor 21b is configured in a substantially U-shaped configuration. The legs of anchor 21b extend down past insulating material 22. The end portions of the legs then curve outwardly in a direction substantially parallel with the base of anchor 21b. Legs of anchor 21b include holes 25b for anchoring the vibration attenuator assembly 10 to a receiving member such as a wall, post or the like. Anchor section 20b further comprises means for securing anchor 21b between insulating material 12b and 22b. By way of example, insulating material 12b and 22b may be secured by way of adhesives or by bonding portions 12b and 22b to the base of anchor 21b. In the embodiment shown in FIGS. 1, 2a and 2b, at least one bolt 23b is used to secure anchor 21b between insulating material 12b and 22b. A countersink hole 24b is provided in insulating portion 22b and laterally aligned with another countersink hole 24b in insulating portion 12b for receiving bolt 23b. Anchor 21b may be comprised of steel, copper, or any other material that provides for suitable anchoring. Preferably, anchor 21b comprises a material that will deform after a certain amount of stress so as to aid insulating material 22 in attenuating seismic forces or vibrations. Where vibration attenuation device 10 is submitted to harsh environmental conditions, an anchor comprising galvanized steel has been found to be advantageous.

As stated previously, anchor section 20a is preferably similar in construction to anchor section 20b. Accordingly, anchor section 20a preferably comprises an anchor 21a, which includes a base 21g and legs 21h. Anchor section 20a preferably further comprises insulating material portions 12a and 22a. Base 21h is positioned between insulating material portions 12a and 22a such that the base is substantially surrounded by insulating material.

Returning now to FIG. 1, anchor section 20b is positioned end-to-end with similarly configured anchor section 20a. The legs of anchor 21b extend from the base of anchor 21b to the base of anchor 21a. The legs of anchor 21a extend from the base of anchor 21a to beyond the base of anchor 21b. The lengths of anchors 21a and 21b are such that when secured to receiving members such as walls, ceilings, and the like, the insulating material between the two anchors will slightly compress and prevent anchor sections 20a and 20b from being loose or unstable. To provide the most stability for device 10, the legs of anchor 21b are positioned to form an angle of approximately 90 degrees with the legs of anchor 21a. Of course, the two anchor sections might be positioned at different angles with respect to each other as well. For example, FIG. 4 illustrates how the anchor sections might be positioned at angles less than 90 degrees to allow for easy installation of device 10 with hanging pipe.

One of the advantages of the present invention is the ease in which it can be incorporated in a variety of circumstances and situations. For example, FIG. 5 illustrates an instance where the present invention is used for mounting a hanging pipe 50 to a rigid structure 9, such as a ceiling. Anchor 21a of a first anchor section comprises steel and has a dimension of 1¼×⅛ inches. The legs of anchor 21a extend from insulating layer 22 to beyond the base of anchor 21b. Anchor 21a is coupled to a stirrup 40 with bolts 8 using a coupling plate 30. A cross-sectional and plan view of coupling plate 30 is shown in FIGS. 3a and 3b, respectively. As shown in FIGS. 3a and 3b, coupling plate 30 comprises holes 31 for receiving bolts 8.

Returning now to FIG. 5, stirrup 40 is typically comprised of a similar material to that of anchor 21a. One end of stirrup 40 is coupled to one end of anchor 21a. Stirrup 40 then extends circumferentially around the outside of pipe 50, the other end of stirrup 40 connecting to the other end of anchor 21a. Anchor 21b of the second anchor section has dimensions similar to anchor 21a. Legs of anchor 21b extend from insulating layer 22 to beyond the base of anchor 21a and are secured to ceiling 9 by way of anchor bolts 11. Insulating layer 22 comprises four cylindrically-shaped rubber sections, each section having a diameter of two inches and a thickness of ½ inches. The interlocking of the two anchor sections provides a vibration attenuating clip 10 that can withstand seismic forces and other vibrations and prevent damage to hanging pipe 50.

FIG. 6 illustrates another example of how the present invention may be used. In FIG. 6, a stud wall 60 is mounted via the present invention to a foundation 70. In this embodiment, the present invention comprises four anchor sections with four sets of anchors 21a, 21b, 21c, and 21d. Each of the anchor sections are configured similarly to the anchor section shown in FIGS. 2a and 2b. Stacking four or more anchor sections together provides more flexibility and better isolation than a vibration mount 10 comprising only two anchor sections. The first anchor section and the second anchor section are arranged end-to-end similar to the embodiment shown in FIG. 1. One end of the third anchor section is adjacent to the second anchor section and the other end of the third anchor section is adjacent to the fourth anchor section. The base of third anchor 21c is positioned between the insulating material of the third anchor section. The legs of anchor 21c extend from the insulating material and past base of fourth anchor 21d, which is positioned between the insulating material of the fourth anchor section. Anchor 21c is coupled to foundation 70 via anchor bolts 13. The legs of anchor 21d extend from fourth anchor section, past the base of anchor 21c, and are coupled to first anchor 21a via coupling plate 30 with bolts 8.

Turning now to FIG. 7, guard rails are often used along highways to prevent cars from drifting off the road. Typically, these rails are rigidly mounted directly to a post. The present invention may be used as an inexpensive mount for these guard rails, providing a superior system with impact attenuation. In FIG. 7, an anchor 21a comprising eight-inch gauge steel and having a dimension of 2½×¼ inches, is coupled to a guardrail 90 by anchor means such as bolts 8. Holes (not shown in FIG. 7) in anchor 21a for receiving bolts 8 have a ⅞ inch diameter. Anchor 21b, having dimensions similar to anchor 21a, extends past the base portion of anchor 21a and is secured to a post 80 by way of bolts 14. Insulating discs 22b, 12b, 22a, and 12a each consist of rubber and have a cylindrical shape with an approximately four-inch diameter and one-inch thickness. The base of anchor 21b is secured between insulating discs 22b and 12b by four bolts (not shown) having ⅛ inch diameters. The distance from the top of the bolts to the top surface of the insulating discs is approximately ³⁄₁₆ inches. Insulating discs 22a and 12a and anchor 21a are secured in a similar manner.

Referring now to FIG. 8, another example of using the present invention to mount pipes to a static structure is illustrated. In this example, instead of the pipe being directly mounted to the rigid structure by way of the present invention, as is shown in FIG. 5, the present invention is used to mount a common rail 100 to a ceiling 9. A first anchor 21a of a vibration attenuating device 10 is mounted to ceiling 9 by bolts 15 and a second anchor 21b is mounted to rail 100 by bolts 85. Pipes 102 are secured to common rail 100 via stirrups 101.

FIG. 9 illustrates the use of the present invention in hanging pipe from a rigid frame. A rail 100 is mounted to a frame 120 by a vibration attenuation assembly 10. Assembly 10 comprises an anchor 21b mounted to frame 120 by mounting bolts 16 and an anchor 21a mounted to rail 100 by bolts 160. A tension sheer insert 121 and a compression-sheer insert 122 are used to mount frame 120 to a concrete wall 130. Frame 120 moves with wall 130 and generally is braced laterally. A pipe 102 hangs from mounting rail 100 using a stirrup 101. A seat 103 can be used to help secure and stabilize pipe 102 within stirrup 101.

Thus, in accordance with the present invention, an anchoring device is achieved that provides seismic force, vibration, and impact attenuation. Further, the device is inexpensive to manufacture and is easy to use with such as things as nonstructural building components and other miscellaneous building structures.

While the invention has been described in conjunction with several specific embodiments, it is evident to those skilled in the art that many further alternatives, modifications, and variations will be apparent in light of the foregoing description.

For example, the number of anchor sections used in vibration attenuator assembly 10 is not limited to two, but may be an increased number that provides the necessary damping for the particular application at hand. Also, portions of anchor 21 may be secured within insulating material 22 in a variety of ways. The method for securing anchor 21 within insulator 22 should not be interpreted to be limited to methods such as bolts, adhesives, or bonding. Further, the shape of anchor 21 is not limited to a U-shape, but may be V-shaped or any other shape that allows the leg of the anchor to extend past the adjacent anchor and provides the necessary damping and attenuation for the particular application.

The invention described herein is intended to embrace all the above variations and any others that may fall within the spirit and scope of the appended claims.

What is claimed is:

1. A vibration attenuation device configured for attachment to a substrate comprising:
   a first section comprising an insulating material;
   a second section second section being adjacent and substantially, coaxially aligned with said first section;
   a first anchor having a base and elongated legs, said base of said first anchor being substantially surrounded by said insulating material of said first section;
   a second anchor having a base and elongated legs, said base of said second anchor being substantially surrounded by said insulating material of said second section; and
   wherein said legs of said first anchor extend in a substantially perpendicular direction from said base of said first anchor beyond said base of said second anchor and said legs of said second anchor extend in a substantially perpendicular direction from said base of said second anchor beyond said base of said first anchor, said legs of said first anchor and said legs of said second anchor being positioned to form an angle greater than 0° with respect to each other.

2. The device of claim 1 wherein said legs of said first anchor and said legs of said second anchor have end portions, said end portions of said first anchor being curved outwardly in a direction substantially parallel with said base of said first anchor and said end portions of said second anchor being curved outwardly in a direction substantially parallel with said base of said second anchor.

3. The device of claim 2 wherein said end portions of said first anchor define holes for anchoring said device to a first substrate and said end portions of said second anchor define holes for anchoring said device to a second substrate.

4. The device of claim 1 wherein said first anchor consists of two legs and said second anchor consists of two legs, said two legs of said first anchor positioned to form an angle of approximately 90 degrees with said two legs of said second anchor.

5. The device of claim 1 wherein said insulating material of said first section further consists of a first insulating portion and a second insulating portion and said base of said first anchor is secured between said first insulating portion and said second insulating portion.

6. The device of claim 5 wherein said first insulating portion and said second insulating portion each further comprises at least one countersink hole, said countersink hole of said first insulating portion being laterally aligned with said countersink hole of said second insulating portion for receiving a bolt for securing said first anchor between said first insulating portion and said second insulating portion.

7. The device of claim 1 wherein said first anchor and said second anchor are each configured in a substantially U-shaped configuration.

8. The device of claim 1 wherein said insulating material of said first section and said second section are cylindrically shaped to provide for easy alignment.

9. The device of claim 1 wherein said insulating material of said first section and said insulating material of said second section are comprised of a similar material.

10. The device of claim 1 further comprising a stirrup for receiving components, said stirrup coupled to said legs of said first anchor.

11. The device of claim 1 further including:
    a third section comprising an insulating material and having two ends, wherein one of said two ends is adjacent to said second section;
    a fourth section comprising an insulating material and an end adjacent to the other of said two ends of said third section;
    a third anchor with a base and legs, said base of said third anchor being substantially surrounded by said insulating material of said third section;
    a fourth anchor with a base and legs, said base of said fourth anchor being substantially surrounded by said insulating material of said fourth section; and
    wherein said legs of said third anchor extend past said base of said fourth anchor towards said substrate, and said legs of said fourth anchor extend past said base of said third anchor and are coupled to said legs of said first anchor.

12. The device of claim 11 further comprising a coupling plate spaced between said legs of said fourth anchor and said legs of said first anchor.

13. An insulating mount for reduction of vibration and seismic forces comprising:
    a first section including a substantially cylindrically-shaped insulating material;
    a second section including a substantially cylindrically-shaped insulating material, said material of said second section being substantially coaxially aligned with said material of said first section;

a first anchor having a base and elongated legs, said base of said first anchor being substantially surrounded by said insulating material of said first section;

a second anchor having a base and elongated legs, said base of said second anchor being substantially surrounded by said insulating material of said second section; and wherein said legs of said first anchor extend in a substantially perpendicular direction from said base of said first anchor to beyond said base of said second anchor and said legs of said second anchor extend in a substantially perpendicular direction from said base of said second anchor to beyond said base of said first anchor, said legs of said first anchor and said legs of said second anchor being positioned to form an angle greater than 0° with respect to each other.

14. The insulating mount of claim 13 wherein said first anchor and said second anchor are each configured in a substantially U-shaped configuration.

15. The insulating mount of claim 13 wherein said insulating material of said first section further consists of a first insulating portion and a second insulating portion and said base of said first anchor is secured between said first insulating portion and said second insulating portion.

16. The insulating mount of claim 13 wherein said legs of said first anchor and said legs of said second anchor have end portions, said end portions of said first anchor being curved outwardly in a direction substantially parallel with said base of said first anchor and said end portions of said second anchor being curved outwardly in a direction substantially parallel with said base of said second anchor.

17. A method for reducing vibration and seismic forces between substrates comprising the steps of:

forming a first anchor section having an insulating material;

forming a second anchor section having an insulating material, said second anchor section being substantially coaxially aligned with said first anchor section;

forming a first anchor having a base and elongated legs;

securing said base of said first anchor between said insulating material of said first anchor section;

forming a second anchor having a base and elongated legs;

securing said base of said second anchor between said insulating material of said second anchor section;

coupling said legs of said first anchor to a first substrate, said legs of said first anchor extending in a substantially perpendicular direction from said base of said first anchor beyond said base of said second anchor; and coupling said legs of said second anchor to a second substrate, said legs of said second anchor extending in a substantially perpendicular direction from said base of said second anchor beyond said base of said first anchor, said legs of said first anchor and said legs of said second anchor being positioned to form an angle greater than 0° with respect to each other.

18. The method of claim 17 wherein said step of forming a first anchor section comprises forming a substantially cylindrically-shaped insulating material and said step of forming a second anchor section comprises forming a substantially cylindrically-shaped insulating material.

19. The method of claim 17 wherein said step of forming a first anchor comprises forming a first anchor having a substantially U-shaped configuration and said step of forming a second anchor comprises forming a second anchor having a substantially U-shaped configuration.

* * * * *